US009334805B2

(12) United States Patent
Takeuchi

(10) Patent No.: US 9,334,805 B2
(45) Date of Patent: May 10, 2016

(54) FIREWALL, PYLON OF AIRCRAFT, AND AIRCRAFT

(71) Applicant: MITSUBISHI AIRCRAFT CORPORATION, Aichi (JP)

(72) Inventor: Akira Takeuchi, Aichi (JP)

(73) Assignee: MITSUBISHI AIRCRAFT CORPORATION, Aichi (JP)

( * ) Notice: Subject to any disclaimer, the term of this patent is extended or adjusted under 35 U.S.C. 154(b) by 179 days.

(21) Appl. No.: 14/162,077

(22) Filed: Jan. 23, 2014

(65) Prior Publication Data
US 2015/0048202 A1 Feb. 19, 2015

(30) Foreign Application Priority Data

Jan. 25, 2013 (JP) .................................. 2013-11745

(51) Int. Cl.
| B64D 45/00 | (2006.01) |
| F02C 7/25 | (2006.01) |
| B64D 27/00 | (2006.01) |
| B64D 29/00 | (2006.01) |
| F02C 7/20 | (2006.01) |
| B64C 7/00 | (2006.01) |
| B64D 27/26 | (2006.01) |
| A62C 2/06 | (2006.01) |
| A62C 3/08 | (2006.01) |

(52) U.S. Cl.
CPC ... *F02C 7/25* (2013.01); *B64C 7/00* (2013.01); *B64D 27/00* (2013.01); *B64D 27/26* (2013.01); *B64D 29/00* (2013.01); *B64D 45/00* (2013.01); *F02C 7/20* (2013.01); *A62C 2/06* (2013.01); *A62C 3/08* (2013.01); *B64D 2027/264* (2013.01); *B64D 2045/009* (2013.01)

(58) Field of Classification Search
CPC ........ B64D 27/16; B64D 27/18; B64D 27/26; B64D 27/262; B64D 27/009
See application file for complete search history.

(56) References Cited

U.S. PATENT DOCUMENTS

| 5,524,846 | A | * | 6/1996 | Shine | ..................... | B64D 27/00 244/121 |
| 5,910,094 | A | * | 6/1999 | Kraft | ..................... | B64D 29/00 277/419 |
| 2003/0201366 | A1 | * | 10/2003 | Connelly | ............... | B64D 33/04 244/121 |
| 2011/0155847 | A1 | * | 6/2011 | Journade | ................ | B64D 33/04 244/54 |
| 2013/0052005 | A1 | * | 2/2013 | Cloft | ..................... | B64D 27/26 415/213.1 |
| 2013/0105622 | A1 | * | 5/2013 | Journade | ................ | B64D 29/02 244/54 |

FOREIGN PATENT DOCUMENTS

| JP | 2008-519409 A | 6/2008 |
| JP | 2011-116186 A | 6/2011 |

* cited by examiner

*Primary Examiner* — Tien Dinh
*Assistant Examiner* — Aaron Rodziwicz
(74) *Attorney, Agent, or Firm* — Pearne & Gordon LLP

(57) ABSTRACT

In order to provide a firewall that is capable of preventing flame passage through a through-hole without any sealant in a connecting part of a component in which a fastener through-hole is formed, a firewall 50 is provided which can prevent a flame from leaking out of the connecting part which connects a first member 51 to a second member 55, particularly through the fastener through-hole TH defined therein. In the firewall 50, the connecting part is a part of a fire-protection chamber 52. As sealing pieces 51*d* and 51*e* which also constitute a part of the fire-protection chamber 52 are in contact with each other, the flame is unable to enter into a closed space CA. Thus, the flame would not reach the connecting part, thereby preventing the flame from leaking out of the firewall 50 to the outside of a nacelle 23.

15 Claims, 5 Drawing Sheets

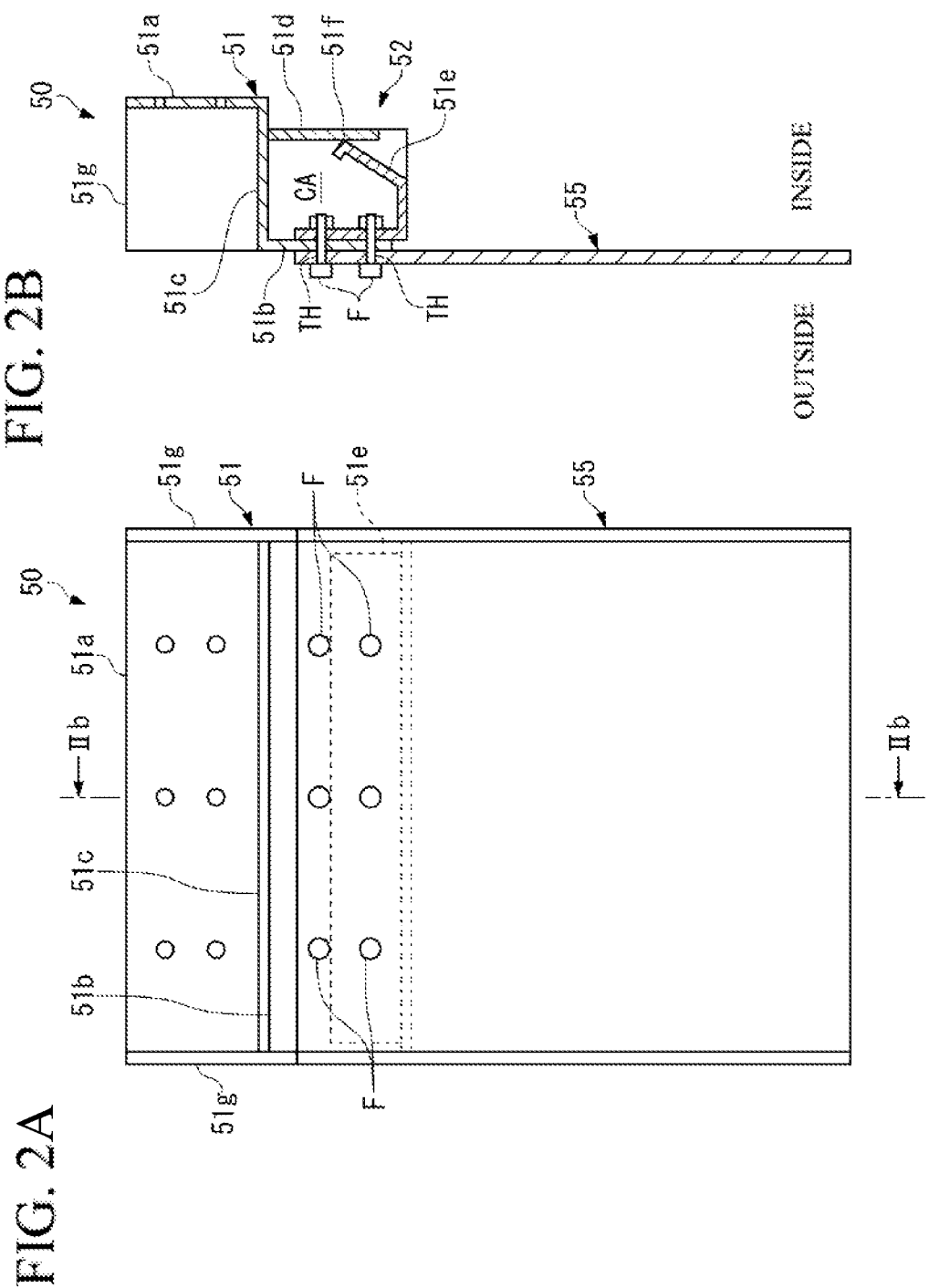

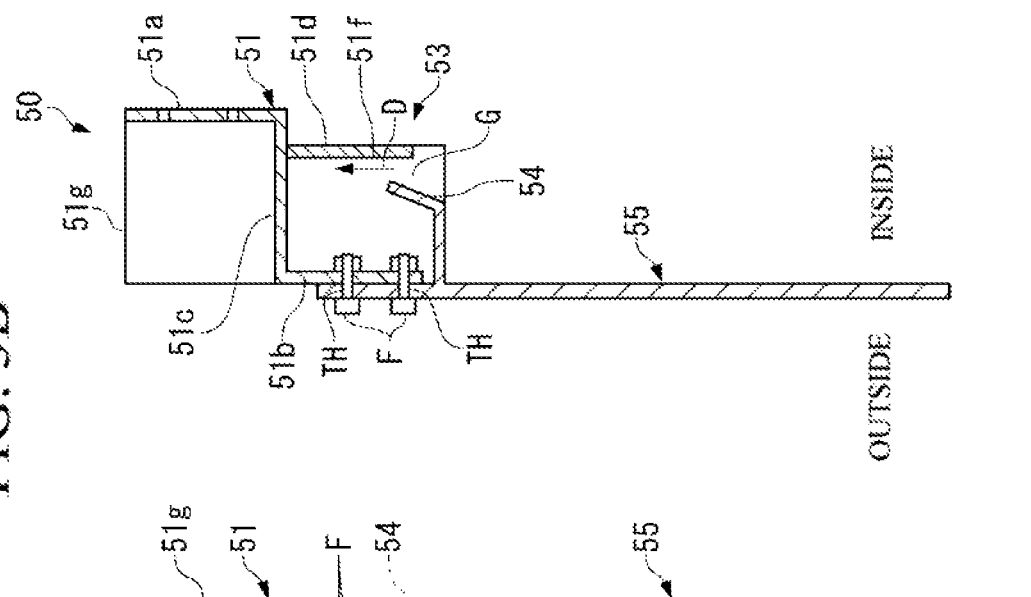
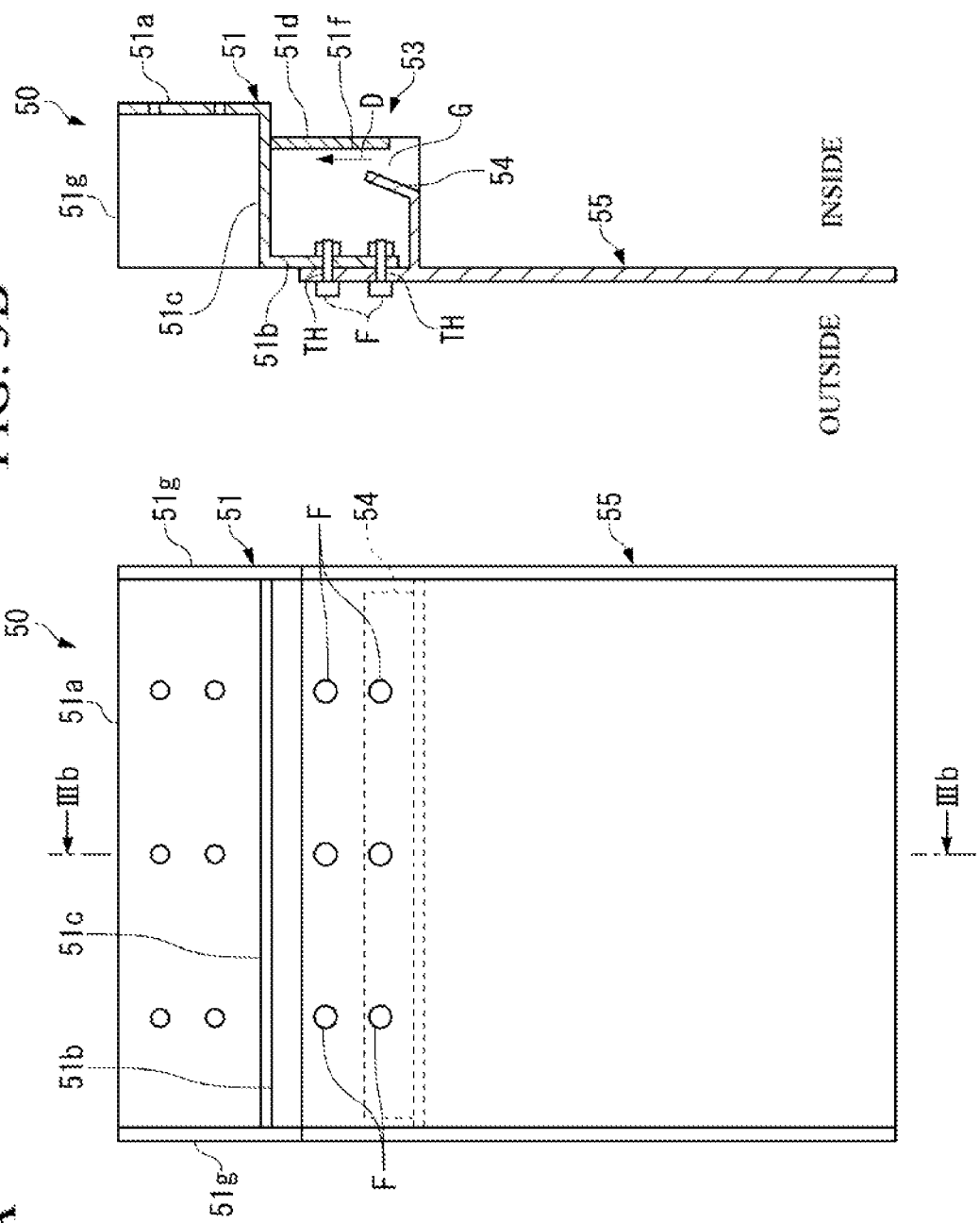

FIREWALL, PYLON OF AIRCRAFT, AND AIRCRAFT

BACKGROUND OF THE INVENTION

1. Field of the Invention

The present invention relates to a firewall that is attached to an aircraft pylon for mounting an engine of an aircraft to a wing.

2. Description of the Related Art

A turbofan type engine of an aircraft is mounted to a wing via a structural member called a pylon strut (see, for example, Japanese Patent Laid-Open No. 2011-116186).

As shown in FIG. 5, a pylon strut 1 is provided on an undersurface of a wing 2 so as to extend toward a front (x) in a flying direction. An engine 4 includes a fan section 4a at the front thereof which is mounted to an undersurface of the pylon strut 1 by a front engine mount 5, and a core section 4b at the rear thereof which is mounted to the undersurface of the pylon strut 1 by a rear engine mount 6. The engine 4 is covered by a cylindrical nacelle 7. The nacelle 7 has a structure capable of being opened and closed. Opening the nacelle towards the right and left enables maintenance and inspection of the engine 4 and its auxiliary machines accommodated in the nacelle. In addition to suspending the engine 4, the pylon strut 1 serves as a pathway through which fuel feeding pipes and electrical cables extending from the body of the aircraft to the engine 4 pass.

It is well known that, in order to improve aircraft safety, a fire-protection zone is provided to separate the engine from the aircraft body. Generally, the fire-protection zone is partitioned by a firewall, i.e., a partition between the engine 4 and the pylon strut 1. As the pylon strut 1 generally has a box-shaped structure with a stiffener member provided inside, the outer wall can be used as a part of the firewall. Or, the pylon strut 1 may be provided with an independent firewall fixed thereon. Thus, considering that electrical cables, for example, pass through the pylon strut 1 and a fire can occur in such a case, it is desirable for the firewall to prevent any flames from spreading.

National Publication of International Patent Application No. 2008-519409 has proposed an electrical connector assembly in which a female connector is fixed to a firewall served by a pylon strut, thereby ensuring a reversible fitting of the engine onto the pylon strut, in addition to providing a firewall function, without significantly increasing the overall dimensions and the weight of a connecting structure between the engine and the pylon strut. National Publication of International Patent Application No. 2008-519409 also teaches that a connector assembly has male and female connectors provided with a fire protection core made of fire-resistant sealant, thereby preventing passage of flames through the connector assembly.

SUMMARY OF THE INVENTION

Not only in the case of the connector assembly disclosed in National Publication of International Patent Application No. 2008-519409, a fire-resistant sealant is useful in filling in holes so as to prevent flames from passing through a firewall in which holes are formed as needed.

For example, in order to enable opening of the nacelle for easy maintenance and inspection of the inside thereof as described above, a part serving as a firewall must be detachably mounted to the structure. Thus, the connecting part of the firewall is fixed to the structure by fasteners. In this case, it is necessary to provide the firewall with a hole through which the fastener passes. In order to prevent flames from passing through the fastener through-hole, fire-resistant sealant can be provided for the connecting part including the holes. However, fire-resistant sealant, in some cases, requires a longer time to be dried and hardened after the application thereof, which increases the time needed to perform maintenance.

The present invention is accomplished in view of such a technical problem, and has an object to provide a firewall capable of preventing flames from passing through a through-hole thereof without any fire-resistant sealant provided for a detachable connecting part of the firewall, and to provide a pylon and an aircraft equipped with the same.

The present invention with such the object provides a firewall disposed around an engine of an aircraft.

The firewall includes a first member fixed to a component provided around the engine; a second member detachably connected to the first member by a fastener; and a fire-protection chamber provided inside a fire-protection zone associated with a connecting part between the first and second members.

Since the firewall of the present invention includes the fire-protection chamber provided inside the fire-protection zone associated with a connecting part between the first and second members where the connecting part may include a fastener through-hole, it can prevent flames from reaching the connecting part even if a fire occurs within the fire-protection zone.

A fire-protection chamber of the present invention may be configured in at least two ways.

In the first configuration, a fire-protection chamber forms a closed system to prevent flames from spreading into the inside the fire-protection chamber. In this configuration, as a fire is prevented from spreading into the inside the fire-protection chamber, there is not any possibility that flames reach the connecting part.

In the second configuration, a fire-protection chamber is provided with a passageway through which the fire-protection chamber communicates with the outside thereof. Even in this configuration, if the passageway extends in a different direction from that toward the connecting part, a fire can be prevented from reaching the connecting part.

According to the present invention, in an aircraft pylon including a pylon strut for supporting an engine of an aircraft and a firewall fixed to the pylon strut, or in an aircraft including the aircraft pylon, the firewall may be configured to include: a first member fixed to the pylon strut; a second member detachably connected to the first member by a fastener wherein the second member contacts a fire-resistant seal attached to a nacelle when the nacelle is closed, the nacelle surrounding the engine and capable of being opened and closed; and a fire-protection chamber provided associated with a connecting part between the first and second members.

In a firewall according to the present invention, a fire-protection chamber is provided inside a fire-protection zone associated with a connecting part between the first and second members where the connecting part may define a fastener through-hole, thereby preventing flames from reaching the connecting part even if a fire occurs within the fire-protection zone.

BRIEF DESCRIPTION OF THE DRAWINGS

FIG. 2A is a front view of the firewall of the present embodiment;

FIG. 2B is a cross-sectional view thereof taken along line IIa-IIa, seen in the direction of arrow in FIG. 2A;

FIG. 3A is a front view of a firewall of a variation of the present embodiment;

FIG. 3B is a cross-sectional view thereof taken along line IIIa-IIIa, seen in the direction of arrow in FIG. 3A;

DETAILED DESCRIPTION OF THE PREFERRED EMBODIMENTS

Hereinafter, a firewall according to the present invention will be described in accordance with an embodiment in which the firewall is mounted to a pylon 60.

Figure 1:
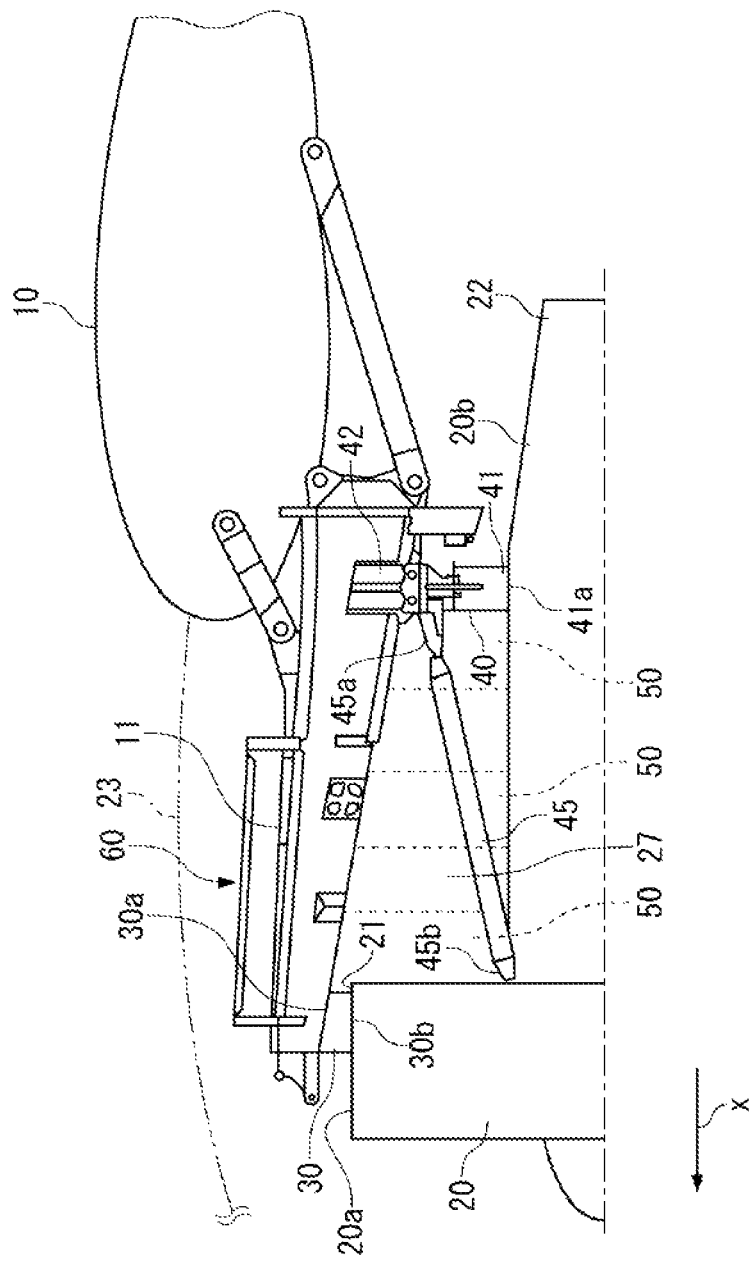
FIG. 1 is a diagram illustrating a pylon strut to which a firewall of the present embodiment is applied, and its surrounding structure.

As shown in FIG. 1, the pylon 60 of the present embodiment supports a turbofan type engine 20 and is mounted to a wing 10 of an aircraft. The pylon 60 is configured to include a pylon strut 11 and a nacelle 23.

The pylon strut 11 is provided at an undersurface of the wing 10 to extend toward a front (x) in a flying direction (See FIG. 1). The shape of the pylon strut 11 in a section orthogonal to a longitudinal direction is, for example, trapezoidal, and its sectional area gradually reduces toward the front side from the rear side.

The engine 20 includes a fan section 20a provided at the front (x) in the flying direction, and an engine core section 20b provided at the rear of the fan section 20a. The fan section 20a is provided with a fan incorporated inside a shroud 21 that is circular in section. The engine core section 20b is accommodated in a housing 22 having a cylindrical shape with a diameter smaller than that of the fan section 20a, and the engine core section includes a mechanism for driving the fan. In the following description, "front" and "rear" are determined based on a flying direction of an aircraft.

In the engine 20, the fan section 20a is mounted to the undersurface of the pylon strut 11 by a front engine mount 30, and the engine core section 20b is mounted to the undersurface of the pylon strut 11 by a rear engine mount 40.

The engine 20 and the pylon strut 11 are accommodated in the nacelle 23. The nacelle 23 has a structure capable of being opened and closed, and opening the nacelle towards right and left enables maintenance and inspection of the engine 20 and its auxiliary machines accommodated in the nacelle.

The front engine mount 30 includes a top surface 30a and an undersurface 30b, which surfaces are fixed to the undersurface of the pylon strut 11 and to the shroud 21 of the fan section 20a of the engine 20, respectively, by connecting means such as bolts.

The rear engine mount 40 is formed of an engine side mount member 41 fixed to the engine 20 side, and a strut side mount member 42 fixed to the pylon strut 11 side.

Here, the engine side mount member 41 has an undersurface 41a fixed to the top surface of the housing 22 of the engine core section 20b of the engine 20 by connecting means such as bolts.

Furthermore, a reinforcing rod 45 is provided which has one end 45a connected to an upper portion of the engine side mount member 41. The other end 45b of the reinforcing rod 45 is connected to a site in the vicinity of a connecting portion of the engine core section 20b and the fan section 20a of the engine 20. This allows the reinforcing rod 45 to reinforce the support for the front side of the engine 20.

In FIG. 1, a space 27 is shown between the pylon strut 11 and the engine core section 20b, and is used for installation of relatively large auxiliary machines of the engine, including, for example, a pre-cooler and an oil cooler for the engine. Since the engine core section 20b is disposed below this space, a wall for partitioning this space is required to function as a firewall so as to prevent flames from leaking out to the outside in the event of a fire within an engine or the like.

Figure 4:
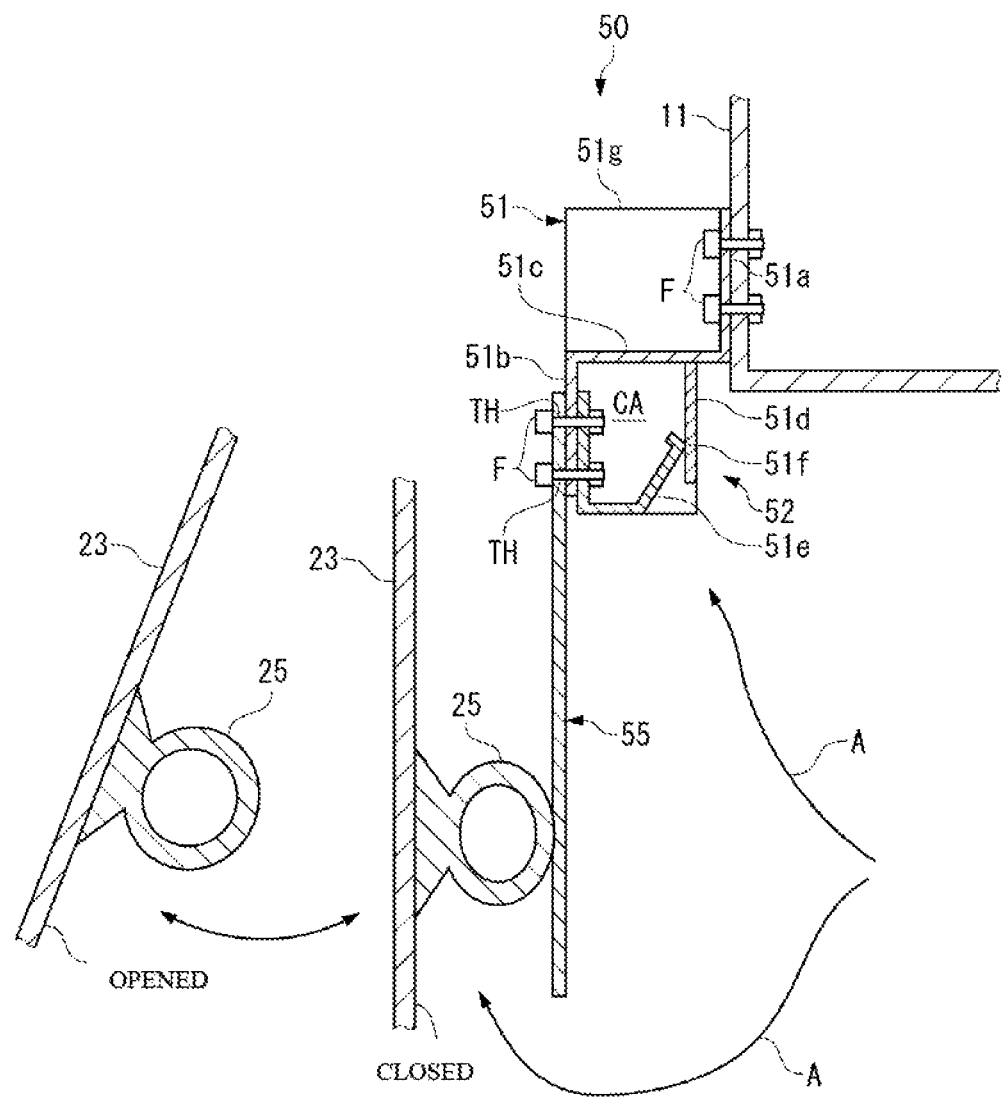
FIG. 4 is a diagram for explaining the function of the firewall of the present embodiment.
Figure 5:
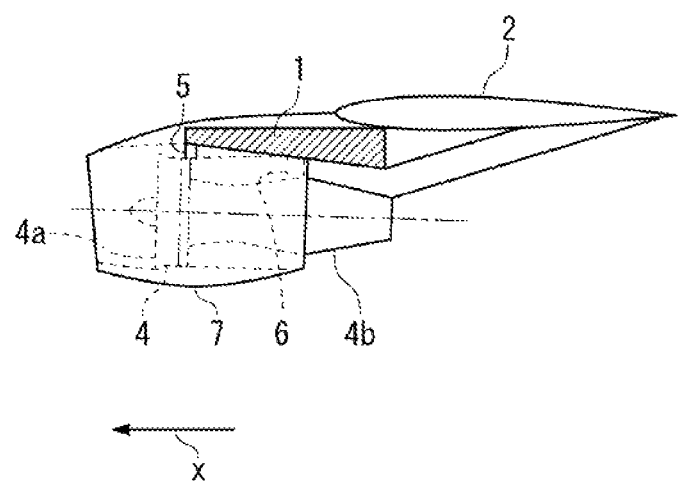
FIG. 5 is a side view showing a wing and an engine of an aircraft.

The pylon 60 is structured to seal between the pylon strut 11 and the nacelle 23 to prevent flames from spreading out of the nacelle 23. As shown in FIG. 4, this structure is configured such that, when the nacelle 23 is closed, a firewall 50 that is attached to the pylon strut 11 presses a fire-resistant seal 25 attached to the nacelle 23. In the present embodiment, a fire-resistant structure provided at a site between the pylon strut 11 and the nacelle 23 is described below. However, for example, as denoted by reference numeral 50 in FIG. 1, such fire-resistant structures are provided at a plurality of sites inside the pylon covered by the nacelle 23.

As shown in FIGS. 2A, 2B and 4, the firewall 50 includes a first member 51 and a second member 55. The first member 51 and the second member 55 are detachably fastened together by a fastener F. The head portion of the fastener F may protrude out of the second member 55 as shown in FIG. 2B, or alternatively, may have a dish shape so as not to protrude out of the second member 55.

In FIG. 4, a flame A is originated mainly in the engine 20 provided below the pylon strut 11, and the firewall 50 prevents the flame A from leaking out of the nacelle 23.

The first member 51 serves as a member for attaching the second member 55 of the firewall 50 to the pylon strut 11.

The first member 51 includes a joining piece 51a fastened to the pylon strut 11 by the fastener F, a joining piece 51b fastened to the second member 55 by the fastener F, and a connecting piece 51c connecting the joining piece 51a to the joining piece 51b. The joining piece 51a, the joining piece 51b, and the connecting piece 51c form a Z shaped longitudinal profile in section.

A sealing piece 51d and a sealing piece 51e are provided at the inside corner between the joining piece 51b and the connecting piece 51c. The sealing piece 51d is located at a position separated from the joining piece 51b by a prescribed distance, and it has an end portion connected to the connecting piece 51c. The sealing piece 51e is located at a position separated from the connecting piece 51c by a prescribed distance, and it has an end portion attached to the joining piece 51b. The sealing piece 51d is formed of a simple flat plate while the sealing piece 51e has a bent portion extending from the vicinity of the center of the sealing piece to an end tip thereof. The bent portion serves as a spring. The sealing piece 51e is further provided with an L-shaped bent portion at the end tip, and the tip 51f of the corner of the L-shaped bent portion abuts onto the sealing piece 51d.

Except that the sealing piece 51e is attached to the joining piece 51b, the second member 55 may further include a member projected therefrom, which is attached to the sealing piece 51e for supporting it from the lower side thereof.

The first member 51 includes a pair of sidewalls 51g provided at opposite sides in the width direction thereof. The pair of sidewalls 51g are attached to the joining piece 51a, the joining piece 51b, the connecting piece 51c, and the sealing piece 51d on the respective side edges in the width direction, whereby the joining piece 51a, the joining piece 51b, the connecting piece 51c, the sealing piece 51d, and the pair of sidewalls 51g define a fire-protection chamber 52 which forms a closed system therein. As the pair of sidewalls 51g are not attached to the sealing piece 51e, the sealing piece 51e can serve as a spring member.

The second member 55 is in the form of a flat panel, and has a top end portion in the longitudinal direction that is attached to the joining piece 51b of the first member 51 by the fastener F. Thus, in the site where the second member 55 and the joining piece 51b are fastened by the fastener F, a fastener through-hole TH is formed to extend through the site. The firewall 50 of the present embodiment has an object of, in addition to preventing flames from leaking out of the fastener through-hole TH, cooperating with the fire-resistant seal 25 to prevent flames from leaking out of the nacelle 23 to the outside. The second member 55 can be detached from the first member 51 by releasing the engagement of the fastener F in order to facilitate the access to the engine 20 and its auxiliary machines during maintenance and inspection.

The sealing piece 51e is provided to extend in the width direction of the sidewall 51g, and the sealing piece 51e is further provided with the L-shaped bent portion at the end tip, and the tip 51f of the corner of the bent portion abuts onto the sidewall 51g.

As shown in FIG. 4, the first member 51 of the firewall 50 is fixed to the pylon strut 11 by the fastener F.

During a flight of the aircraft, the nacelle 23 is closed ("CLOSED" in the drawing), and the firewall 50 presses the fire-resistant seal 25 attached to the nacelle 23. The fire-resistant seal 25 is provided to extend in the width direction of the firewall 50. Thus, in the event of a fire from a fire origin such as the engine 20, flames A is prevented from spreading out of the nacelle 23, that is, into the atmosphere.

When the nacelle 23 is opened for maintenance and inspection ("OPENED" in the drawing), the fire-resistant seal 25 is moved away from the firewall 50 to release the seal structure between the nacelle 23 and the firewall 50. Under this condition, the second member 55 is detached from the first member 51 for maintenance and inspection.

The operation and effects of the firewall 50 with the above configuration are described below.

It is assumed that the flame A spreads from the engine 20 towards the firewall 50 (FIG. 4). The firewall 50 can prevent the flame from leaking out of the connecting part which connects the first member 51 to the second member 55, particularly through the fastener through-hole TH. That is, the connecting part is a part of the fire-protection chamber 52, and since the sealing pieces 51d and 51e are in contact with each other, the flame reaching the sealing pieces 51d and 51e is unable to enter into a closed space CA. This results in that the flame would not reach the connecting part, thereby preventing the flame from leaking out of the firewall 50, that is, to the outside of the nacelle 23.

As the sealing piece 51e is not fixed to the sidewall 51g, the fire-protection chamber 52 provided in the firewall 50 is capable of elastically deforming. Thus, even if the firewall 50 receives loads caused by vibration or impact during a flight of the aircraft, the fire-protection chamber 52 absorbs the vibration or impact by a part of the sealing piece 51e that elastically deforms. This results in the firewall 50 with higher resistance to vibration and impact.

In the firewall 50 as described above, the sealing piece 51e is in contact with the sealing piece 51d so that the fire-protection chamber 52 has a closed perimeter. Though the fire-protection chamber 52 forming a closed system is most effective in preventing flames from leaking out of the chamber, the present invention is not so limited.

For example, a fire-protection chamber 53 as shown in FIGS. 3A and 3B is enough to prevent flames from reaching the connecting part between the first member 51 and the second member 55. That is, a sealing piece 54 is not in contact with but separated from the sealing piece 51d, a gap G is formed between the sealing pieces 54 and 51d. However, though the gap G can be a passageway for flames, the gap G is formed along the vertical direction in the drawing. Even if flames pass through the gap to reach the joining piece 51b, it is extremely difficult for the flames to reach the connecting part between the first member 51 and the second member 55. Moreover, in consideration of the small size of the gap G, it cannot be assumed that the flames would reach the connecting part.

As described above, though the fire-protection chamber 53 includes the gap G which provides a passageway for flames, the connecting part is located at a position deviated from an extension line of the passageway. The passageway extending in a different direction D from that toward the connecting part, can prevent flames from leaking out to the outside. In FIGS. 3A and 3B, the same reference numerals are used to identify the same components as indicated in FIGS. 2A and 2B.

While the preferred embodiments of the present invention have been described above, the present invention is not limited thereto.

While the firewall 50 is located below the pylon strut 11, such a firewall may be located at any position around an engine of an aircraft where there is a concern that flames would enter through a connecting part.

The fire-protection chambers 52 and 53 exhibit cuboid appearance. However, even when a chamber has another form of appearance such as cylindrical shape and polygonal column shape, it is capable of preventing flames from leaking out to the outside provided that the chamber is configured to form a closed system, or the chamber is configured such that it has a passageway through which flames can pass, and which, however, extends in a different direction from that toward a connecting part.

Other than this, the configurations cited in the above described embodiments can be selected or omitted, or can be arbitrarily changed to the other configurations, without departing from the gist of the present invention.

What is claimed is:

1. A firewall disposed around an engine of an aircraft comprising:
    a first member fixed to a component provided around the engine;
    a second member detachably connected to the first member by a fastener; and
    a fire-protection chamber that at least partially encloses a connecting part between the first and second members, the fire-protection chamber defining a space within, wherein the space is between the engine and the connecting part.

2. The firewall of an aircraft according to claim 1, wherein the fire-protection chamber forms a closed space therein.

3. The firewall of an aircraft according to claim 1 or claim 2, wherein:
    the first member comprises a pair of sidewalls provided at opposite sides in a width direction thereof, a first joining piece fastened to a pylon strut for supporting the engine, a second joining piece fastened to the second member, and a connecting piece connecting the first joining piece to the second joining piece;
    a first sealing piece and a second sealing piece are provided at an inside corner between the second joining piece and the connecting piece;
    the pair of sidewalls are attached to the first joining piece, the second joining piece, the connecting piece and the first sealing piece, respectively; and the second sealing piece is in contact with the first sealing piece.

4. The firewall of an aircraft according to claim 3, wherein the pair of sidewalls are not attached to the second sealing piece, and the second sealing piece elastically deforms.

5. The firewall of an aircraft according to claim 1, wherein:
the fire-protection chamber is partly defined by a first sealing piece and a second sealing piece;
the second sealing piece is in contact with the first sealing piece; and
the second sealing piece elastically deforms.

6. The firewall of an aircraft according to claim 5, wherein the second sealing piece serves as a spring member.

7. The firewall of an aircraft according to claim 1, wherein the fire-protection chamber is provided with a passageway through which the fire-protection chamber communicates with the outside thereof, and wherein the passageway extends in a different direction from that toward the connecting part.

8. An aircraft pylon comprising:
a pylon strut for supporting an engine of an aircraft; and
a firewall disposed around an engine of an aircraft comprising:
a first member fixed to a component provided around the engine,
a second member detachably connected to the first member by a fastener, and
a fire-protection chamber provided associated with a connecting part between the first and second members;
wherein:
the firewall is fixed to the pylon strut via the first member; and
the second member contacts a fire-resistant seal attached to a nacelle when the nacelle is closed, the nacelle surrounding the engine and capable of being opened and closed.

9. An aircraft comprising:
a pylon including: a pylon strut for supporting an engine of the aircraft; and the firewall according to claim 1;
a nacelle for surrounding the engine, wherein the nacelle is capable of being opened and closed; and
a fire-resistant seal attached to the nacelle;
wherein
the firewall is fixed to the pylon strut via the first member; and
the second member contacts the fire-resistant seal when the nacelle is closed.

10. The aircraft pylon according to claim 8, wherein the fire-protection chamber forms a closed space therein.

11. The aircraft pylon according to claim 8 or claim 10, wherein:
the first member comprises a pair of sidewalls provided at opposite sides in a width direction thereof, a first joining piece fastened to a pylon strut for supporting the engine, a second joining piece fastened to the second member, and a connecting piece connecting the first joining piece to the second joining piece;
a first sealing piece and a second sealing piece are provided at an inside corner between the second joining piece and the connecting piece;
the pair of sidewalls are attached to the first joining piece, the second joining piece, the connecting piece and the first sealing piece, respectively; and
the second sealing piece is in contact with the first sealing piece.

12. The aircraft pylon according to claim 11, wherein the pair of sidewalls are not attached to the second sealing piece, and the second sealing piece elastically deforms.

13. The aircraft pylon according to claim 8, wherein:
the fire-protection chamber is partly defined by a first sealing piece and a second sealing piece;
the second sealing piece is in contact with the first sealing piece; and
the second sealing piece elastically deforms.

14. The aircraft pylon according to claim 13, wherein the second sealing piece serves as a spring member.

15. The aircraft pylon according to claim 8, wherein the fire-protection chamber is provided with a passageway through which the fire-protection chamber communicates with the outside thereof, and wherein the passageway extends in a different direction from that toward the connecting part.

* * * * *